United States Patent Office 3,123,627
Patented Mar. 3, 1964

3,123,627
FAT HYDROGENATION
William H. Flank, Chester, James E. McEvoy, Morton, and Harold Shalit, Drexel Hill, Pa., assignors to Air Products and Chemicals, Inc., Philadelphia, Pa., a corporation of Delaware
No Drawing. Filed July 20, 1962, Ser. No. 211,426
2 Claims. (Cl. 260—409)

This invention relates to fat hydrogenation and is concerned particularly with improvements therein made possible by the novel hydrogenation catalysts herein described. The invention includes methods for the preparation of catalyst particles possessing a sufficiently high activity for hydrogenation of unsaturated carbon-carbon linkages and the advantageous application of such catalyst in the hydrogenation of fats, fatty acids and/or other organic materials susceptible to hydrogenation.

The relative activities of a series of catalysts for promoting a particular organic reaction at specified conditions may be indicated by expressions of the relative reaction rates. For example, the relative hydrogenation activities of a series of catalysts may be expressed in terms of the percent conversion per minute at standard test conditions. Such conversion rates may be designated as "$k$ values."

Some catalysts which possess attractive initial activity are unsatisfactory for commercial use by reason of their poor stability and their rapid deactivation under the process conditions employed. During prolonged use of almost any catalyst, some lessening of the activity of fresh catalyst occurs. After even short use of a catalyst, superior processing is attainable by substituting fresh catalyst, but the advantages are insufficient to pay for such fresh catalyst. The catalyst is eventually sufficiently deactivated that the improved results attainable by the use of fresh catalyst justify the cost for the replacement of the catalyst. What is an economical catalyst life is therefore influenced by the specific features of the industrial process in which the catalyst is employed. The same catalyst might have a useful life of only a few hours while processing an expensive feedstock at severe conditions and a useful life of many months while treating a cheap feedstock at mild conditions because catalyst replacement involves the achievement of sufficient marginal profit from the use of fresh catalyst to compensate for all costs involved in catalyst replacement. Instead of describing merely the time period during which a catalyst can be employed, technologists have described the weight of product profitably produced per unit weight of active component of the catalyst as an indicator of the usefulness (involving activity, stability and/or selectivity) of the catalyst. In some of the typical commercial operations for the hydrogenation of unsaturated glycerides, prior workers have been able to obtain quantities such as 1000 pounds of hydrogenated fat per pound of nickel in the catalyst employed for the hydrogenation. Accordingly, chemists preparing fat hydrogenation catalysts have had the goal of achieving sufficient stability to permit such commercial preparation of at least 1000 pounds of hydrogenated fat per pound of nickel employed in a catalyst.

The fatty acids and their derivatives embrace the naturally occurring saturated acids such as capric, palmitic and stearic acids and the unsaturated acids such as oleic, linoleic, and linolenic; their naturally occurring glycerides; and the compounds characterized by a functional group at the end of a fatty chain, such as the derivative alcohols, acids, amines, ethyl esters and sorbitol esters. These may be of vegetable and/or animal origin, and may be either liquids or solids. For many decades it has been the practice to hydrogenate such fatty acid derivatives to prepare products more resistant to oxidation in air and/or possessing advantages attributable to greater saturation of such fatty material. In the most used hydrogenation method, a mixture of diatomaceous earth and nickel catalyst is dispersed into molten fat and subjected to hydrogen under pressure in a batch process. The catalyst is filtered from the hydrogenated oil, the diatomaceous earth aiding the filtration. In a modification of this procedure a nickel catalyst is dispersed into a stream of molten fat and passed through the hydrogenation zone as a continuous stream. As with the batch process, the catalyst is separated from the product by filtration. Frequently only a small portion of the catalyst recovered by filtration is replaced by fresh catalyst prior to recycling of the catalyst. The pounds of product per pound of active component in the catalyst may be calculated on a monthly production basis rather than upon a single run basis.

Numerous proposals have been made for the hydrogenation of fatty acid materials (i.e. glycerides, fatty acids, fatty alcohols and/or other such materials processed by the fat hydrogenation industry) over a bed of catalyst. Although chemical engineers have generally preferred the use of a catalyst bed in preference to dispersed catalyst systems for substantially all large scale chemical processes, great difficulty has been encountered in the attempts to devise a fat hydrogenation method employing a bed catalyst. This failure has been attributable in large part to the inability to achieve a catalyst having both sufficient activity for fat hydrogenation and sufficient stability to impart to the bed process a ratio of product to catalyst substantially equal or superior to the 1000:1 ratio achieved in connection with dispersed catalyst systems. In the development of the present invention, particular attention was devoted to the problem of achieving sufficient activity in the catalyst to make feasible results in the fat hydrogenation field superior to those obtained with catalysts described in the prior art.

This application is a continuation in part of our copending application Ser. No. 812,138, filed May 11, 1959. In accordance with our invention a highly active hydrogenation catalyst is prepared by decomposing nickel formate impregnated into a silica carrier prepared in a particular manner, whereby the silica carrier possesses a high proportion of large pores through which large liquid molecules such as fatty glyceride molecules may diffuse. Not only is the pore size of the carrier controlled by the method of preparing the carrier, but also the nickel formate is converted into nickel under a specific range of conditions to achieve an advantageous hydrogenation catalyst possessing satisfactory activity for the hydrogenation of liquid organic materials.

The high proportion of large pores in the silica support is accomplished by the inclusion of pulverized silica gel during the preparation of a silica hydrosol. In preferred embodiments of the present invention the particle size of the added silica powder is from 5 to 15 microns as an average particle size. The quantity of particles below 1 micron and greater than 20 microns should be held to a minimum. The powder-included hydrosol is converted to a hydrogel, which is treated (e.g., washed, dehydrated and calcined) to provide a silica gel having a high proportion of large pores. The powder-containing silica gel characterized by the high proportion of large pores is employed as a carrier for nickel.

To obtain catalyst of superior activity, it is important not only to provide the proper silica gel support, but also to incorporate the nickel in a particular manner. The superior catalysts of the invention are prepared by impregnating the special silica gel carrier with a nitrogenous nickel solution prepared from nickel formate and a larger molar amount of a strongly basic nitrogen material. The impregnated carrier is then heated in a gas stream, such as air, at a temperature in the range of 90 to 160° C., and preferably about 120° C., to volatilize at least a portion of the basic nitrogenous material and to volatilize excess water. The thus dried particles characterized in readily decomposable nickel compound on silica are heated in a gas stream at a temperature of about 280° C. to about 550° C. The duration of this treatment (calcination) may be as short as 30 minutes. Treatment of more than two hours, while not damaging the catalyst, provides only slight improvement. The gas stream is a gas or mixture of gases which is not detrimentally reactive with either the decomposable nickel compound or the decomposition products thereof. Such gases include nitrogen, the noble gases, methane and, preferably, hydrogen; also, mixtures of such gases may be used. The space velocity of the gas stream is preferably at least 100 volumes of gas per volume of catalyst per hour. The gas stream superficial velocity (i.e., ignoring the solids content of the catalyst chamber and calculating the velocity as if the catalyst zone were empty) should be at least 100 centimeters per minute at activation temperatures as low as 280° C. The gas stream superficial velocity should be at least 20 cm./min. at the higher activation temperatures. It is necessary to control the superficial gas velocity, the temperature, the space velocity, the duration of the treatment, and the choice of gas in order to assure the attainment of the desired activity. For example, the space velocity of the gas stream may be reduced below 100 volumes of gas per volume of catalyst per hour if temperatures of about 538° C. are employed. The requirements for gas velocity and duration of treatment are sometimes partly dependent upon the peculiarities of the specific apparatus employed. Hence, exact formulae setting limits according to the temperature are less useful than the understanding of the requirements at appropriate temperature limits. As a result of the decomposition of the nickel formate, metallic nickel is deposited (preferably in amounts equivalent to 7–15% nickel) on the silica carrier, and gaseous products comprising carbon dioxide, carbon monoxide, hydrogen and/or steam are evolved from the catalyst.

A theory has been devised that at least one of the decomposition products is capable of poisoning the freshly formed nickel catalyst sites unless removed from the catalyst promptly. The gases from the decomposition have a velocity which is dependent in part upon the decomposition rate, which increases as the temperature is increased. Even at the highest feasible temperature, the decomposition-induced velocity of the product gases is insufficient to prevent such poisoning action, and the velocity of the product gases is even more inadequate at lower decomposition temperatures, thus necessitating a sweeping gas at any operable decomposition temperature and necessitating a higher minimum sweep gas velocity throughout the lower portion of the decomposition range. Thus, the sweeping gas has sufficient velocity to remove such decomposition products rapidly. Regardless of the validity of the theory, the high activity catalysts are achieved by compliance with the requirements set forth for the activation treatment.

Because the nickel on silica catalysts prepared in accordance with the present invention possess both a satisfactory stability and a superior activity for the hydrogenation of organic materials susceptible to hydrogenation, such catalysts permit the utilization of methods of hydrogenation which would not have been appropriate with the catalysts of the prior art. Because nickel catalysts are readily poisoned by sulfur and phosphorus compounds such materials should be absent from the feed stock. The improved catalyst may be utilized in batch operation, dispersed catalyst continuous operation and/or continuous hydrogenation over a bed of hydrogenation catalyst. The stability of the catalyst is especially important in connection with the use of a bed of catalyst, but also is important in dispersed catalyst systems where small amounts of the catalyst are employed in processing rather large amounts of oil. The range of conditions employed may be conveniently expressed in relation to a hydrogenation method employing a bed of catalyst, but the corresponding values for batch operation and/or continuous dispersed catalyst operation can be estimated therefrom by those skilled in the art. The unsaturated organic material may be hydrogenated in the presence of sufficient hydrogen to provide a hydrogen to feed stock mol ratio of from 0.3:1 to 30:1 at an elevated temperature of from about 70° C. to about 240° C. at a pressure from atmospheric to 4000 pounds per square inch at a space rate from 0.1 to 30 volumes of charge per volume of catalyst per hour. In some instances, temperatures of as low as 50° C. may be employed. The stability of the nickel on powder-included silica catalyst is at least four times the stability of the previously described typical commercial fat hydrogenation catalysts.

Several methods for the evaluation of catalyst have been employed, and reference is made to procedures designated as an "Olive Oil Hydrogenation Test," and as a "Benzene Hydrogenation Test."

OLIVE OIL HYDROGENATION TEST

An apparatus for the hydrogenation of organic materials includes a pressure bomb, power driven means for rocking the pressure bomb, a hydrogen reservoir, pressure control valves whereby the hydrogen pressure within the reaction bomb may be maintained constant throughout the hydrogenation reaction, and indicating means for the hydrogen reservoir to indicate the quantity of hydrogen consumed. The apparatus includes electrical means for heating the contents of the pressure bomb and for measuring the temperature of the contents of the pressure bomb.

In conducting a test for the hydrogenation of olive oil, 92 g. of olive oil is added to the pressure bomb and thereafter a sealed glass ampoule of catalyst particles containing 0.1 g. of nickel (0.11% by weight of the olive oil) is immersed in the olive oil and the ampoule is broken and the catalyst particles are mixed with the olive oil. The bomb is sealed, evacuated to remove most of the air, purged with nitrogen, and again evacuated and filled with hydrogen. The contents of the pressure bomb are heated to the standard 350° F. temperature for the test and the hydrogen pressure within the bomb is increased to the standard pressure of 100 pounds per square inch. The hydrogen reservoir is initially adjusted to 200 p.s.i.g. Substantially no hydrogenation of the olive oil occurs up to this stage of the test, inasmuch as the catalyst has been effective only for the dissolved hydrogen diffusing toward the unagitated catalyst particles in the lowermost liquid. Moreover, the hydrogen dissolves in the unagitated oil at a very slow rate. Immediately upon the beginning of the agitation of the contents by rocking the bomb, the reaction proceeds at a rate which is influenced only by the activity of the catalyst being tested. The reaction rate can be measured most accurately by observing the rate at which the hydrogen in the hydrogen reservoir is withdrawn through the automatic pressure regulator into the pressure bomb for consumption in the hydrogenation reaction. The hydrogenation of the olive oil is continued until the consumption of hydrogen corresponds to that required to prepare the desired product, after which the rocking of the bomb and the maintenance of the supply of high pressure hydrogen to the bomb is discontinued. The contents of the bomb are allowed to cool until the bomb may be depressurized and the product removed therefrom.

The hydrogenated olive oil is analyzed to determine the iodine number, thus confirming the accuracy of the hydrogen consumption measurements. From the data on the total lowering of the iodine number of the olive oil at the standard test conditions and the reaction time required for the test, the rate of lowering the iodine number per minute is calculated. The activity of the catalyst is expressed by an activity index or iodine number index, numerically identical to the iodine number lowering per minute at the standard test conditions. The analyses of the iodine number of the feedstock and product supplement and confirm the calculations based upon the observations of the pressure drop in the hydrogen reservoir during the hydrogenation reaction.

BENZENE HYDROGENATION TEST

This test is conducted with the same apparatus and general procedure as employed in the Olive Oil Hydrogenation Test. The quality of benzene employed is 44 g. (50 ml.) and the test results are calculated on the basis of catalyst containing 0.25 g. of nickel (0.57% of weight of benzene). Commercially available fat hydrogenation catalysts were tested at said 0.57% nickel concentration. The hydrogen reservoir is initially at 1500 p.s.i.g. and the bomb is maintained at 1000 p.s.i.g. The benzene is heated to 300° F. Substantially no hydrogenation occurs prior to the rocking of the bomb. The hydrogenation of benzene to cyclohexane is significantly more exothermic than the hydrogenation of olive oil, but the heat losses from the apparatus prevent the organic material from reaching a temperature significantly higher than the 300° F. test temperature during most tests. With catalysts active enough to provide as much as about 20% conversion per minute, there may be a tendency toward runaway temperatures whereby the reaction goes to completion; therefore appropriate temperature control measures may be necessary. The reaction rates are determined from calculations based upon the rate of hydrogen withdrawal from the hydrogen reservoir, and are confirmed by calculations based upon measurement of the refractive index of the product. The percentage of cyclohexane in a two component mixture of cyclohexane and benzene can be determined with an accuracy of about 0.2% by measurement of the refractive index of the mixture, and this determination is simpler than the titrimetric measurement of iodine number of the hydrogenated olive oil. Moreover, the cyclohexane-benzene mixtures are normally more readily removed from the bomb than the liquid, and more readily removed from the bomb than the semisolid hydrogenated olive oil.

The invention is further clarified by reference to a plurality of examples.

*Example I*

High purity silica gel powder having an average particle size of about 10 microns, all of the particles being within the range of from 1 to 20 microns, was suspended in an aqueous sodium silicate solution having a silica content four times as great as the added silica powder. The suspension was mixed with aqueous sulfuric acid to prepare a hydrosol, which was discharged onto the surface of a kerosene bath to form globules. As the globules fell through the kerosene, firm hydrogel beads were formed by the setting of the hydrosol. The beads were treated with excess aqueous ammonium nitrate as a base exchange step and then water washed, thereby removing all sodium salts from the silica. The purified silica beads were dried for several hours at a temperature above 121° C. but no greater than 177° C. in the presence of a high humidity atmosphere and then in dry air for several hours at a higher temperature whereby the residual water content was reduced to less than 5 weight percent. In the powder-included silica gel beads thus prepared, more than 50% of the pore volume was provided by pores having a pore radius greater than 20 Angstroms, that is, a pore diameter greater than 0.004 micron. The pore size distribution was measued and the beads were found to have characteristics as follows:

| Pore Radius, A. | Pore Diam., Microns | Cumulative Percent of Pore Volume |
|---|---|---|
| 10 | .002 | 20.2 |
| 20 | .004 | 32.5 |
| 30 | .006 | 52.7 |
| 40 | .008 | 70.5 |
| 50 | .010 | 76.7 |
| 60 | .012 | 79.0 |
| 90 | .018 | 81.4 |
| 200 | .040 | 83.0 |
| 500 | .1 | 83.7 |
| >500 | 1.5 | 95.0 |

In repeated preparations of high purity large pore size silica particles it is established that the critical requirement for attaining the minimum of 50% of the pore volume in pores having a diameter greater than 0.004 micron is the use of high purity synthetic silica gel powder in preparing the silica hydrosol, the other details of the preparation of the support requiring primarily the carefulness generally practiced by skilled chemists experienced in preparing catalysts and catalyst supports.

A solution was prepared consisting of: nickel formate dihydrate, 555 g. (3 mols); concentrated ammonium hydroxide, 557 g. (13 mols); and water in a quantity sufficient to provide 1 liter of solution. The molar ratio of ammonia to nickel ions was about 4.33 to one. Approximately 1493 g. of powder-included silica gel particles prepared as previously described were employed to absorb the liter of nickel ammonium formate solution. The impregnated particles were dried to volatilize excess water and ammonia and to provide particles containing nickel formate dihydrate impregnated into silica. The thermal decomposition of the nickel formate on silica particles was conducted in an oven maintained at 280° C. for 4½ hours. A gas stream of nitrogen was employed to sweep the gaseous decomposition products away from the catalyst particles during the thermal decomposition of the nickel formate, care being exercised to maintain a gas velocity of at least 20 cm. per minute, thus withdrawing the gaseous products of the decomposition rapidly enough to minimize their poisoning effect upon the catalyst. The thus activated catalyst contained 10.7% metallic nickel. The catalyst was significantly more active than commercially available nickel and/or nickel-silica catalysts. The catalyst was tested by the Benzene Hydrogenation Test and achieved 100% conversion in less than 4 minutes, indicating an activity of more than 25% conversion per minute, thus being many times as active as commercially available catalysts.

Several nickel and nickel on silica catalysts regularly marketed to fat hydrogenators were tested according to the Benzene Hydrogenation Test in order to determine the standard above which the catalyst should be in order to have a competitive advantage over such regularly marketed catalysts, thus obtaining the following results:

TABLE

| Prior Art Catalyst [1] | Percent Conv. | Minutes | Percent Conv. per Minute |
|---|---|---|---|
| A | 29 | 63 | 0.5 |
| B | 8 | 63 | 0.1 |
| C | 26 | 30 | 0.9 |
| D | 12 | 30 | 0.4 |

[1] Catalyst A (G-15)—25% Ni on 9% kieselguhr; reduced and in hardened vegetable oil (tallow). Catalyst B (G-49)—52.8% Ni on kieselguhr; reduced and stabilized. Catalyst C (Rufert's Flakes)—25.9% Ni in beef tallow. Catalyst D (Selectol-C)—27.6% Ni flaked, reduced and stabilized in hard fat.

Catalysts prepared in accordance with the present invention consistently had an activity corresponding to at least 5% conversion per minute, thus being several times more active than the nickel and nickel on silica catalysts commercially available prior to the present invention.

The initial activity of the catalyst was evaluated by the Olive Oil Hydrogenation Test and achieved a hydrogenation rate equivalent to lowering the iodine number at a rate of 2.68 $I_2$ number per minute. In the test of a commercially available nickel-silica catalyst as a standard for comparison, the rate was equivalent to the lowering of iodine number at only 0.3 $I_2$ number per minute in the Olive Oil Hydrogenation Test. In establishing the necessity for the use of powder-included silica gel, a catalyst was prepared on commercially available silica gel, impregnated with nickel ammonium formate, and converted to a nickel on silica catalyst for testing the effect of the carrier as the single different feature. In the Olive Oil Hydrogenation Test, said catalyst had an activity providing a rate of lowering of iodine number of only 0.1 $I_2$ number per minute. A different type of control catalyst was prepared by impregnating nickel nitrate into the highly advantageous carrier consisting of high purity powder-included silica gel, followed by heating at 121° C. to dry and calcining at 566° C. in air to decompose the nitrate to form nickel oxide on powder-included silica catalyst beads, and then reducing in a hot stream of hydrogen to form nickel on powder-included silica gel catalyst, in order to test the effect of the nitrate instead of the formate as the single variant. In the Olive Oil Hydrogenation Test, the nickel on powder-included silica gel derived from nickel nitrate had an activity providing a rate of lowering of iodine number of 0.3 $I_2$ number per minute, thus being about equivalent to catalysts marketed commercially for fat hydrogenation, but significantly inferior to the nickel formate-derived catalysts of the present invention.

*Example II*

Particles of powder-included silica impregnated with nickel formate dihydrate were prepared in accordance with the previous example, comprising the drying of nickel ammonium formate soaked beads. Instead of activating the particles in a nitrogen stream, the particles were activated by a stream of hydrogen at 300° C. for 4.5 hours at a gas velocity of 20 cm. per minute. The catalyst was active for hydrogenating benzene to cyclohexane, providing 100% conversion in less than 2 minutes, or more than 50% conversion per minute.

A control catalyst was prepared by activating said nickel formate dihydrate impregnated powder-included silica particles (prepared in accordance with Example I) in a hydrogen stream at a temperature of 300° C. for 5 hours at a gas velocity of 14 cm. per minute. This control catalyst was subjected to the Benzene Hydrogenation Test and found to possess an activity providing a benzene conversion of about 1.9% per minute.

By a series of tests it is established that catalysts activated at a temperature of 280° C. or higher in a gas stream having a velocity of at least 20 cm. per minute are significantly superior to catalysts activated in a gas stream of lower velocity. If the activation is conducted at a temperature above 250° C. but below 280° C., the gas velocity must be higher. Effective catalysts have been prepared by conducting the activation at 250° C. at a superficial gas velocity of the hydrogen at 100 cm. per minute.

*Example III*

A technical grade of ethylene diamine is heated to 71° C. and saturated with nickel formate dihydrate. The ratio of amino groups to the nickel is greater than 4:1, thus making possible a molar concentration of the nickel formate significantly higher than would be feasible in an aqueous system containing no nitrogenous complexing agent. The solution of nickel formate in aqueous ethylene diamine is employed for impregnating powder-included silica beads prepared in accordance with a previous example. The resulting product is dried by heating at 145° C. The thus prepared nickel compound on powder-included silica gel bead catalyst is activated by heating at 310° C. for 4 hours while passing a hydrogen gas stream through the bed of catalyst granules at a velocity of 30 cm./minute. The catalyst consists of about 10% metallic nickel on powder-included silica beads. These catalyst granules possess satisfactory activity.

In modifications of this general method, the aqueous nickel formate solution contains, in lieu of the ethylene diamine, at least one compound such as dimethyl amine, hydrazine, methyl amine, or other nitrogenous materials which are relatively strong bases. A mixture of ammonium hydroxide and a volatile aliphatic amine may be employed. The concentration of the base is sufficient to provide more nitrogen atoms than nickel atoms. For example, there may be from 2 to 6 nitrogen atoms per nickel ion in the nickel complex; there may be additional nitrogenous base in the solution containing the nickel complex.

The impregnated beads are dried at a temperature from about 100° C. to about 145° C. to volatilize excess water and most of the nitrogenous material. The thus dried nickel-containing complex on powder-included silica gel is activated by treatment with a hydrogen gas stream at a temperature within the range from 250–550° C., desirably at about atmospheric pressure. The gas stream velocity is desirably high such as within the range from about 30 cm./min. to 200 cm./min. and must be at least 20 cm./min. for activation temperatures of 280° C. and above and must be at least 100 cm./min. for an activation temperature of 250° C. The duration of the treatment should be at least about 30 minutes at 280° C. and higher, and may desirably be an hour or more at lower temperatures. The resulting catalyst is advantageous by reason of its attractive combination of activity and stability. The activated beads are crushed to provide particles having a minimum size of about 500 microns, suitable for dispersion in cottonseed oil, fish oil, or the like.

A control catalyst is prepared following the identical procedure, but passing the hydrogen through the catalyst bed at a velocity of 10 cm. per minute, and the catalyst is much less active than the catalyst prepared using the higher gas velocity required by the present invention. By a series of tests, it is established that the nickel formate catalysts decomposed at 280–400° C. in a gas stream at a velocity of at least 20 cm. per minute are significantly superior to such catalysts decomposed in a gas stream having a velocity less than 20 cm. per minute.

*Example IV*

Powder-containing beads prepared as described in Example I were impregnated with nickel from aqueous nickel ammonium formate containing about 16 mols per liter of ammonium hydroxide and about 3.5 mols per liter of nickel formate. The impregnated beads were dried 2 hours at about 125° C. The nickel formate on silica beads were analyzed and reported to contain 10.55% nickel, indicative that a catalyst containing 13.7% nickel would result from the activation thereof. The catalyst beads were activated in a hydrogen stream at an activation temperature of 300° C. for 6 hours using a hydrogen sweeping gas at 22 cm. per minute. Particles of the activated catalyst were subjected to a standard activity test for the hydrogenation of olive oil. The hydrogen pressure in the reservoir dropped from 220 p.s.i.g. to 134 p.s.i.g. in 25 minutes, thus indicating that the iodine number of the oil was lowered from 83.6 to 17.5 (subsequently confirmed by titrimetric analysis). These data permitted the calculation of an activity index of 2.65 iodine numbers per minute for the nickel on powder-included silica gel catalyst.

*Example V*

Powder-included silica beads are prepared in accordance with Example I, and then subjected to grinding to provide a powder having a particle size within the range from about 300 to about 700 microns and an average particle size of about 500 microns. Concentrated ammonium hydroxide weighing 2270 g. is employed to dissolve 1346 g. of nickel formate dihydrate, and the aqueous solution of nickel ammonium formate is impregnated in 2270 g. of said powder-included silica particles of 500 micron average particle size. The approximately 430 ml. of excess solution (containing unabsorbed nickel ammonium formate) is decanted. The impregnated powder is dried at 125° C. to remove ammonia, and activated in a hydrogen stream at 22 cm. per minute at about 310° C. for 3 hours. In the Olive Oil Hydrogenation Test, the catalyst particles are sufficiently active to lower the iodine number at a rate of 2.5 iodine numbers per minute.

*Example VI*

High purity silica gel having an average particle size of 15 microns, all of the particles being between 10 and 20 microns, is dispersed in a commercial grade of sodium trisilicate, and the mixture is sprayed into a churn together with an aqueous solution of nitric acid to form a hydrosol which soon sets to a hydrogel. Wet treatment of the hydrogel slurry with aqueous ammonium nitrate and water provides a silica hydrogel of low sodium content. Drying and calcining of the hydrogel provides a silica gel, which after grinding and classification, provides a fraction consisting of particles of from about 400 to about 600 microns and having an average particle size of about 500 microns. More than 50% of the pore volume of each particle is provided by pores having a diameter of at least 0.004 micron. A sample of 100 grams of the powder is impregnated with an aqueous solution prepared by adding 59.4 g. of nickel formate dihydrate to 100 g. of concentrated ammonium hydroxide, and thereafter drying the powder and activating it at 300° C. in a rapidly (about 110 cm. per minute) flowing hydrogen stream to provide a catalyst consisting of about 13% nickel on silica.

The catalyst activity is evaluated by subjecting olive oil to hydrogenation at the standard test conditions and by noting the iodine number reduction per minute. The 13% nickel on powder-included silica provided is active enough to provide a rate of 2.6 units of lowering of the iodine number per minute, in contrast with a rate of lowering of the iodine number of 0.5 unit per minute for a commercially available fat hydrogenation catalyst and in contrast with a rate of lowering of the iodine number of 0.4 unit per minute for pyrophoric Raney nickel.

*Example VII*

Cottonseed oil was subjected to a preliminary drying by passage over a fixed bed of calcined adsorptive clay pellets at a space rate of 1 volume of oil per volume of clay per hour at a temperature of 43° C., thereby significantly reducing the water content of the oil. The clay-dried oil was further dried under vacuum at a pressure of about 0.5 atmosphere at about 99° C. for 3 hours. The vacuum dried oil was passed over a fixed bed of nickel on powder-included silica beads prepared in accordance with Example I. The oil was catalytically hydrogenated at a space rate of 2 volumes of oil per volume of catalyst per hour at a hydrogen to oil mol ratio of 6 at a temperature of 177° C. at a hydrogen pressure of 300 pounds per inch square gauge. The operation was conducted for 185 hours. The initial product had a congeal point of 52° C. as did the final product. The initial product had an iodine number of 52 as did the final product. The hydrogenation method had satisfactory stability. The 370 volumes of oil processed over the 10% nickel catalyst corresponded to 5160 pounds of oil per pound of nickel. In a series of long term stability tests, it is established that the nickel on powder-included silica particles activated by a hot gas stream having the velocity, space rate, composition, etc. required by the present invention provide excellent hydrogenation activity over a long useful life to provide more than 4000 pounds of product per pound of nickel. In a series of fat hydrogenation tests, it is established that the superior catalyst of the present invention possesses a stability at least four times the stability of previously marketed fat hydrogenation catalysts, notwithstanding variations in process conditions such as space rates from 0.1 to 30 v./v./h., gauge pressures from 100 to 4000 pounds per square inch, hydrogen to glyceride mol ratios from 3 to 30, and hydrogenation temperatures from 70° C. to 240° C.

*Example VIII*

Cottonseed oil was dried at 141° C. in a vacuum of 1 to 3 mm. Hg and then cooled to 104° C. for storage. Thereafter 200 g. of oil was removed from storage, heated to a temperature of approximately 132° C. and charged to a reaction chamber comprising a three necked, 500 ml., round bottom flask. Said flask contained a Pyrex-blade stirrer. The hydrogenation of the oil was obtained in the presence of 8.6% nickel on powder-included silica beads, prepared in accordance with Example I, by maintaining a nominal temperature of 132° C. in the reaction chamber together with 1 atmosphere of pressure for approximately two hours. During this time the stirrer was maintained at a speed of 540 r.p.m. Purified hydrogen, metered by a rotameter at a rate of 20 l./hr. was introduced through one of the side necks of the reaction flask while the other side neck was used as a hydrogen outlet.

It was noted that not only was the nickel macroporous silica catalyst still highly active after 4 to 6 cycles but said catalyst was also found to possess excellent filtration characteristics. When 20 ml. oil samples were withdrawn by suction into a cylindrical tube at predetermined time intervals during each run a small amount of catalyst was also unavoidably withdrawn at the same time. Said catalyst was recovered, however, by vacuum filtration of the oil using Grade 42 Whatman paper. While the instant nickel-macroporous silica catalyst was easily filtered by a single pass, commercial catalyst, such as finely divided nickel, required (under identical circumstances) as many as 15 passes to clear the sample before analysis.

*Example IX*

Not only the catalyst beads of Example I, but also the powdered catalyst particles of Example VI possess advantageous stability. A series of tests establish that more than 4000 pounds of product per pound of nickel in such powdered catalyst can consistently be obtained at typical commercial conditions for fat hydrogenation, thus indicating that the activity and stability of such catalyst are significantly superior to those characteristic of commercially available nickel catalysts.

*Example X*

A commercial grade of a mixture of fatty acids derived from soybean oil is vacuum dried at 10 mm. Hg pressure absolute and 121° C. for 2 hours. The dried charge is mixed with powdered catalyst beads of Example VI and hydrogenated at conditions including a temperature of 149° C., pressure of 1500 p.s.i.g. and at a space rate of 0.5 v./v./h. in the presence of a mol ratio of 5 hydrogen to 1 fatty acid, thereby preparing a hydrogenated product. Similarly, at suitable conditions of temperature, pressure and space velocities other saturated fatty acid derivatives are prepared from alcohols, amines, ethyl esters, monoesters or sorbitol esters of such soybean fatty acids; saturated fatty acid amines are prepared from the fatty acid nitriles of such soybean fatty acid mixtures at selected processing conditions.

Obviously many modifications and variations of the invention as hereinbefore set forth may be made without departing from the spirit and scope thereof, and therefore only such limitations should be imposed as are indicated in the appended claims.

What is claimed is:

1. The method of hydrogenating fatty acid material containing significant amounts of material selected from the group consisting of unsaturated fatty acids and esters thereof; which method consists essentially of the steps of: heating said fatty acid material at a reduced pressure to remove water therefrom; subjecting vacuum dried fatty acid material to a catalytic hydrogenation zone maintained at a temperature in the range of 50–240° C.; which zone contains particles of nickel on powder-containing silica gel of large pore size prepared by decomposing nickel formate dihydrate impregnated on powder-containing silica gel particles at a temperature within the range from 280 to about 538° C. in a gas stream having a superficial velocity of at least 20 cm./min., said powder-containing silica gel particles having been prepared by the dehydration of a wet gelatinous mass resulting from the admixture of an aqueous siliceous solution with silica particles having an average particle size from 5 to 15 microns, whereby most of the pore volume involves pores having a diameter greater than 40 Angstroms; said hydrogenation zone containing hydrogen at a pressure from atmospheric to 4000 pounds per square inch, the molar ratio of hydrogen to fatty acid material being from 0.3:1 to 30:1 and the catalyst to fatty acid material to time relationships corresponding to a space rate of from 0.1 to 30 volumes of fatty acid material per volume of catalyst per hour; and withdrawing as product of the method a more saturated fatty acid material.

2. The method of hydrogenating fatty acid material, containing a significant amount of material selected from the group consisting of unsaturated fatty acids and esters thereof; which method consists essentially of the steps of: subjecting such fatty acid material to a catalytic hydrogenation zone maintained at a temperature in the range of 50–240° C.; which zone contains particles of catalyst prepared by dispersing silica powder having an average particle size from 5 to 15 microns in an aqueous alkaline silicate solution providing from 3 to 5 times as much silica as the powder, reacting said dispersion with acid to form a silica hydrosol, setting the silica hydrosol to silica hydrogel, purifying the silica hydrogel to remove salts therefrom and to obtain a high purity silica hydrogel, calcining the hydrogel to prepare silica gel particles having a high proportion of large pores by reason of powder-inclusion, cooling the silica gel particles, impregnating the classified powder-included silica gel particles with an aqueous nitrogenous nickel formate solution containing a strongly basic nitrogenous material in a molar concentration of nickel, heating the impregnated particles at a temperature above 90° C. to volatilize excess water and at least a part of the nitrogenous material and to prepare nickel compound impregnated particles of powder-included silica gel, heating the impregnated particles in a gas stream at a temperature of 280° C. to about 538° C. at a superficial velocity of at least 20 cm./min. to remove gaseous decomposition products and to form nickel on powder-included silica gel particles and cooling the particles to provide a nickel hydrogenation catalyst; said hydrogenation zone containing hydrogen at a pressure from atmospheric to 4000 pounds per square inch, the molar ratio of hydrogen to fatty acid material being from 0.3:1 to 30:1 and the catalyst to fatty acid material to time relationships corresponding to a space rate of from 0.1 to 30 volumes of fatty acid material per volume of catalyst per hour; and withdrawing as product of the method a more saturated fatty acid material.

No references cited.

UNITED STATES PATENT OFFICE
CERTIFICATE OF CORRECTION

Patent No. 3,123,627                          March 3, 1964

William H. Flank et al.

It is hereby certified that error appears in the above numbered patent requiring correction and that the said Letters Patent should read as corrected below.

Column 3, line 15, for "reatcive" read -- reactive --; column 8, line 66, for "220" read -- 200 --; column 9, line 8, for "in 2270 g." read -- into 2270 g. --; column 12, line 28, for "molor" read -- molar --.

Signed and sealed this 23rd day of March 1965.

(SEAL)
Attest:

ERNEST W. SWIDER
Attesting Officer

EDWARD J. BRENNER
Commissioner of Patents